(12) United States Patent
Miettinen

(10) Patent No.: US 11,066,525 B2
(45) Date of Patent: Jul. 20, 2021

(54) METHOD AND APPARATUS FOR SEPARATING LIGNOCELLULOSE PARTICLE FRACTION AND LIGNIN PARTICLE FRACTION, LIGNIN PARTICLE COMPOSITION, LIGNOCELLULOSE PARTICLE COMPOSITION AND THEIR USE

(71) Applicant: UPM-KYMMENE CORPORATION, Helsinki (FI)

(72) Inventor: Mauno Miettinen, Lappeenranta (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 15/110,784

(22) PCT Filed: Jan. 9, 2015

(86) PCT No.: PCT/FI2015/050010
§ 371 (c)(1),
(2) Date: Jul. 11, 2016

(87) PCT Pub. No.: WO2015/104459
PCT Pub. Date: Jul. 16, 2015

(65) Prior Publication Data
US 2016/0333146 A1  Nov. 17, 2016

(30) Foreign Application Priority Data
Jan. 13, 2014 (FI) ........................ 20145020

(51) Int. Cl.
*B07B 7/00* (2006.01)
*C08H 8/00* (2010.01)
(Continued)

(52) U.S. Cl.
CPC ................ *C08H 8/00* (2013.01); *B01J 20/24* (2013.01); *B01J 20/28016* (2013.01);
(Continued)

(58) Field of Classification Search
CPC ...... B03B 7/00; B03D 1/02; B03D 2203/001; B03D 3/06; B01J 20/24; B01J 20/28016;
(Continued)

(56) References Cited

U.S. PATENT DOCUMENTS 3,817,826 A * 6/1974 Hoye ........................ D21C 5/00
162/93
4,292,089 A * 9/1981 Regnault ............ B01D 11/0276
127/1
(Continued)

FOREIGN PATENT DOCUMENTS

EP        2489780 A1    2/2011
KR   2013-0108800 A   10/2013
(Continued)

OTHER PUBLICATIONS

El-Shenawy et al., "Use of polymeric coagulants for increasing the efficiency of lignin separation from kraft and soda pulping black liquors of agricultural residues", Papel, Associacao Brasileira Technicade Celulose E Papel, Sao Paulo, BR, vol. 69, No. 7, pp. 43-57 (Jun. 2008).

(Continued)

*Primary Examiner* — Joseph C Rodriguez
(74) *Attorney, Agent, or Firm* — Nixon Peabody LLP

(57) ABSTRACT

A method and an apparatus for separating lignocellulose particle fraction (3) and lignin particle fraction (4), in which crude lignin (1) formed from starting material (6) comprises lignocellulose particles and lignin particles. The method comprises adding stabilizing chemical (11) and/or hydrophobic chemical (12) into the crude lignin (1) in at least one step, and treating the crude lignin by separating the lignin particle fraction (4) and lignocellulose particle fraction (3)

(Continued)

from each other in at least one separation step (2,8,9,10). Further, a lignocellulose particle fraction and a lignin particle fraction and their uses.

13 Claims, 4 Drawing Sheets

(51) Int. Cl.

| | | |
|---|---|---|
| C08H 7/00 | (2011.01) | |
| C08L 97/00 | (2006.01) | |
| C08L 97/02 | (2006.01) | |
| B03D 1/02 | (2006.01) | |
| B01J 20/24 | (2006.01) | |
| B01J 20/28 | (2006.01) | |
| B01J 20/30 | (2006.01) | |
| B03D 3/06 | (2006.01) | |
| D21H 17/23 | (2006.01) | |
| B01D 21/00 | (2006.01) | |

(52) U.S. Cl.
CPC ............ *B01J 20/3085* (2013.01); *B03D 1/02* (2013.01); *B03D 3/06* (2013.01); *C08H 6/00* (2013.01); *C08L 97/005* (2013.01); *C08L 97/02* (2013.01); *B01D 21/00* (2013.01); *B03D 2203/001* (2013.01); *C08L 2205/02* (2013.01); *D21H 17/23* (2013.01)

(58) Field of Classification Search
CPC .... B01J 20/3085; D21C 11/0085; C08H 6/00; C08H 8/00; C08L 97/02; C08L 97/005
See application file for complete search history.

(56) References Cited

U.S. PATENT DOCUMENTS

| | | | | |
|---|---|---|---|---|
| 4,908,098 A * | 3/1990 | DeLong | .................. | C08H 6/00 162/16 |
| 5,138,007 A * | 8/1992 | Meister | ................. | C08F 289/00 527/400 |
| 5,478,366 A * | 12/1995 | Teo | ......................... | C10L 1/324 44/301 |
| 5,635,024 A * | 6/1997 | Shall | .................. | D21C 11/0007 162/16 |
| 5,730,837 A | 3/1998 | Black et al. | | |
| 6,632,327 B1 * | 10/2003 | Shall | .................. | D21C 11/0007 162/16 |
| 6,942,754 B2 * | 9/2005 | Izumi | ..................... | D21C 5/005 162/37 |
| 7,666,637 B2 * | 2/2010 | Nguyen | .................... | C12P 7/10 435/161 |
| 8,309,328 B1 * | 11/2012 | Dhawan | .................. | C12P 19/12 435/72 |
| 8,546,561 B2 * | 10/2013 | Kilambi | .................. | C08H 8/00 536/128 |
| 8,728,243 B2 * | 5/2014 | Van Der Meulen | ..... | C08H 8/00 127/36 |
| 8,815,052 B2 * | 8/2014 | Ohman | .............. | D21C 11/0007 162/16 |
| 8,853,478 B2 * | 10/2014 | Machhammer | ......... | C07C 37/54 162/173 |
| 9,487,712 B2 * | 11/2016 | Shuai | ........................ | C10L 1/04 |
| 9,512,495 B2 * | 12/2016 | Eyal | ........................ | C08H 8/00 |
| 9,719,210 B2 * | 8/2017 | Miettinen | .............. | D21C 11/10 |
| 9,765,478 B2 * | 9/2017 | Brandt | ..................... | D21C 3/06 |
| 9,914,948 B2 * | 3/2018 | Del Rio | .................... | C12P 7/56 |
| 10,138,332 B2 * | 11/2018 | Jansen | ................ | C08B 37/0057 |
| 2011/0179841 A1 * | 7/2011 | Lu | .............................. | C05F 7/00 71/12 |
| 2012/0132379 A1 | 5/2012 | Patt et al. | | |

FOREIGN PATENT DOCUMENTS

| | | | | |
|---|---|---|---|---|
| RU | 2189996 C2 | 9/2002 | | |
| WO | 2009028969 A1 | 3/2009 | | |
| WO | WO-2013095204 A1 * | 6/2013 | ............... | C12P 7/10 |
| WO | 2013166469 A2 | 11/2013 | | |
| WO | WO-2013166469 A2 * | 11/2013 | ......... | B01D 15/1821 |

OTHER PUBLICATIONS

Russian Decision to Grant a Patent for Invention—Application No. 2016131886/05 dated Nov. 26, 2018 with English translation.
Pedro Fardim, Chemical Pulping Part 1, Fibre Chemistry and Technology Totally Updated, Papermaking Science and Technology, 2011, https://ebooks.papereng.fi/ebooks/upm/Vol6_PST_part1/page_1.html, 15 pages.
Abgor, V. et al., "Biomass pretreatment: Fundamentals toward application," Biotechnology Advances 29 (2011) 675-685 (11 pages).
Wu, S. et al., "An Improved Method for Isolating Lignin in High Yield and Purity," Journal of Pulp and Paper Science: vol. 29, No, 7, Jul. 2003, pp. 235-240 (6 pages).
Yang, H. et al., "Comparative study of lignin characteristics from wheat straw obtained by soda-AQ and kraft pretreatment and effect on the following enzymatic hydrolysis process," Bioresource Technology 207 (2016 ) 361-369 (9 pages).
Voloch, M. et al., in Cereal Polysaccharides in Technology and Nutrition, V. F. Rasper, ed., Am. Association of Cereal Chemists, St. Paul, Minnesota, 1984, Bioutilization of Cereal Lignocellulose (23 pages).

* cited by examiner

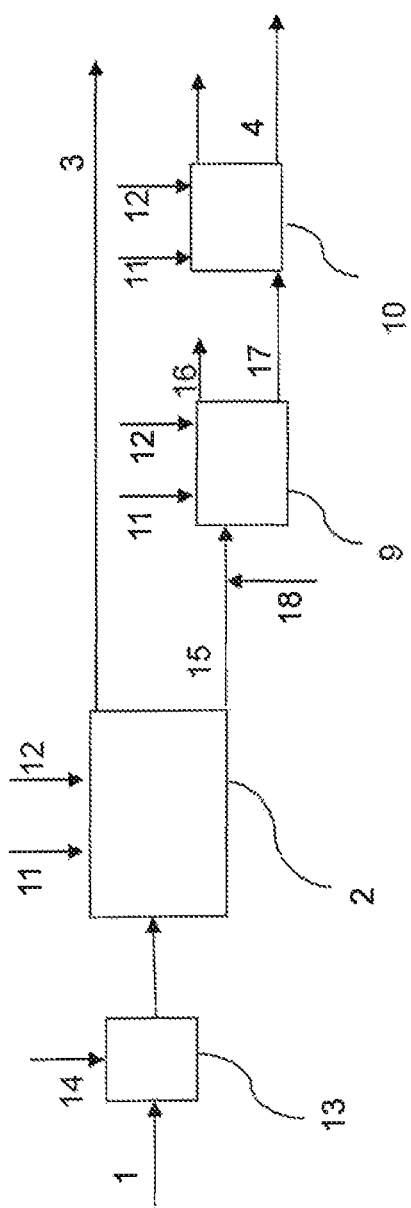

US 11,066,525 B2

METHOD AND APPARATUS FOR SEPARATING LIGNOCELLULOSE PARTICLE FRACTION AND LIGNIN PARTICLE FRACTION, LIGNIN PARTICLE COMPOSITION, LIGNOCELLULOSE PARTICLE COMPOSITION AND THEIR USE

CROSS-REFERENCE TO RELATED APPLICATIONS

This application is a 35 U.S.C. § 371 National Phase Entry Application of International Application No. PCT/FI2015/050010 filed Jan. 9, 2015, which designated the U.S., and which claims priority to FI Application No. 20145020 filed Jan. 13, 2014, the contents of each of which are incorporated herein by reference in their entireties.

FIELD OF THE INVENTION

The invention relates to a method and an apparatus for separating lignocellulose particle fraction and lignin particle fraction. Further, the invention relates to a lignin particle composition and a lignocellulose particle composition and their uses.

BACKGROUND OF THE INVENTION

Known from prior art is different methods for forming lignin from different raw materials, such as biomass. Many bio-refinery processes, e.g. hydrolysis, generate crude lignin, such as lignin residue, after hydrolysis of biomass. This water-insoluble lignin residue usually contains significant percentage of non-hydrolyzed lignocellulose particles together with free lignin particles.

Further, known from prior art is to treat lignin chemically by dissolving lignin in dissolvent, such as in NaOH, alcohol-water mixture or organic acid, and to precipitate lignin, e.g. by sulphuric acid or water. Then pure lignin can be provided, but known processes suffer from high operating and capital costs. Removing and/or recovering of dissolvent or formed salt lead to additional costs. Final dewatering of lignin is usually carried out by filtration. Size of precipitated lignin particle is generally rather small, which has negative effect on filtration rate and dry solids content of filter cake.

OBJECTIVE OF THE INVENTION

The objective of the invention is to disclose a new method for separating lignocellulose particle fraction and lignin particle fraction. Another objective of the invention is to disclose a new method for purifying lignin. Another objective of the invention is to produce a purified lignin particle composition and lignocellulose particle composition with improved properties.

SUMMARY OF THE INVENTION

A method for separating lignocellulose particle fraction and lignin particle fraction includes adding a stabilizing chemical and/or a hydro-phobic chemical into the crude lignin in at least one step and separating the lignin particle fraction and the lignocellulose particle fraction from the crude lignin in at least one solid-solid separation step.

An apparatus for separating lignocellulose particle fraction and lignin particle fraction includes at least one separating device for separating the lignin particle fraction and the lignocellulose particle fraction from the crude lignin in at least one solid-solid separation step, at least one first feeding device for feeding the crude lignin into the at least one separating device, and at least one second feeding device for adding a stabilizing chemical and/or a hydrophobic chemical into the crude lignin in at least one step.

A lignin particle composition includes a lignin particle fraction of crude lignin, the crude lignin comprising lignocellulose particles and lignin particles, wherein the lignin particle fraction has been formed from the crude lignin by adding stabilizing chemical and/or hydrophobic chemical into the crude lignin in at least one step, and by separating the lignocellulose particle fraction from the lignin particle fraction in at least one solid-solid separation step.

A lignocellulose particle composition includes a lignocellulose particle fraction of crude lignin, the crude lignin comprising lignocellulose particles and lignin particles, wherein the lignocellulose particle fraction has been formed from the crude lignin by adding stabilizing chemical and/or hydrophobic chemical into the crude lignin in at least one step, and by separating the lignocellulose particle fraction from the lignin particle fraction in at least one solid-solid separation step.

BRIEF DESCRIPTION OF THE FIGURES

The accompanying drawings, which are included to provide a further understanding of the invention and constitutes a part of this specification, illustrate some embodiments of the invention and together with the description help to explain the principles of the invention. In the drawings:

FIG. 4 is a flow chart illustration of a method according to another embodiment of the present invention.

DETAILED DESCRIPTION OF THE INVENTION

Figure 1:
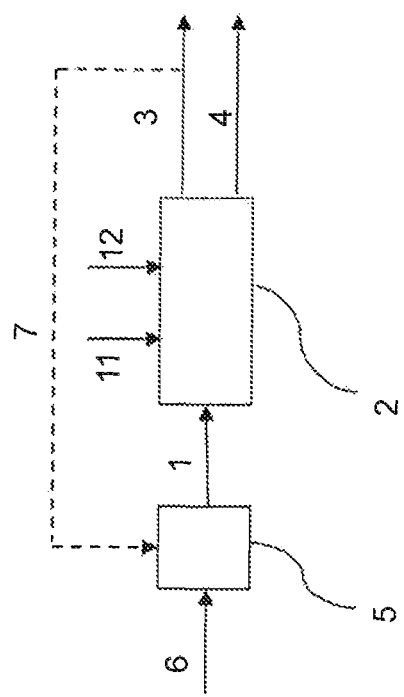
FIG. 1 is a flow chart illustration of a method according to one embodiment of the present invention.

The invention relates to a method for separating lignocellulose particle fraction (3) and lignin particle fraction (4). In the method of the present invention crude lignin (1) formed from starting material (6) comprises lignocellulose particles and lignin particles, wherein the method comprises: adding stabilizing chemical (11) and/or hydrophobic chemical (12) into the crude lignin (1), such as into the crude lignin or fraction of the crude lignin, in at least one step; and treating the crude lignin by separating the lignin particle fraction (4) and lignocellulose particle fraction (3) from each other in at least one separation step (2,8,9,10). In a preferred embodiment, the lignin particle fraction is a purified crude lignin.

Figure 2:
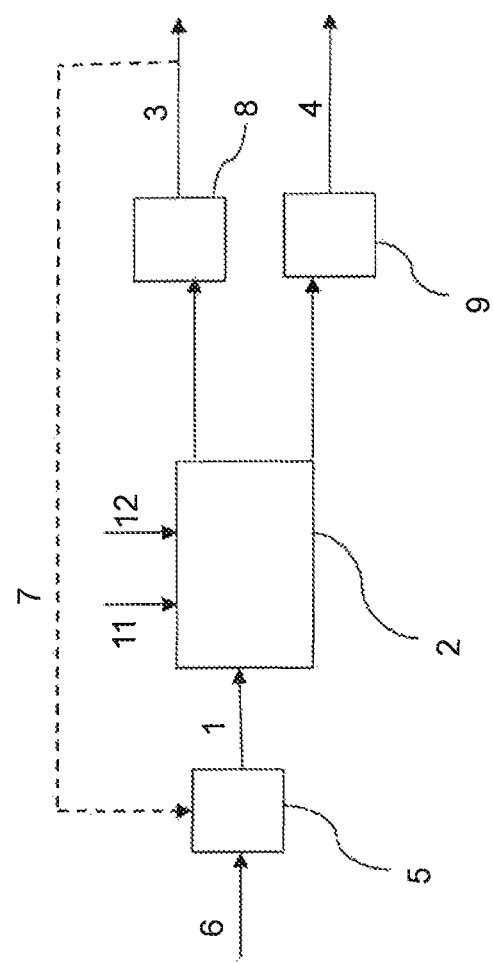
FIG. 2 is a flow chart illustration of a method according to another embodiment of the present invention.
Figure 3:
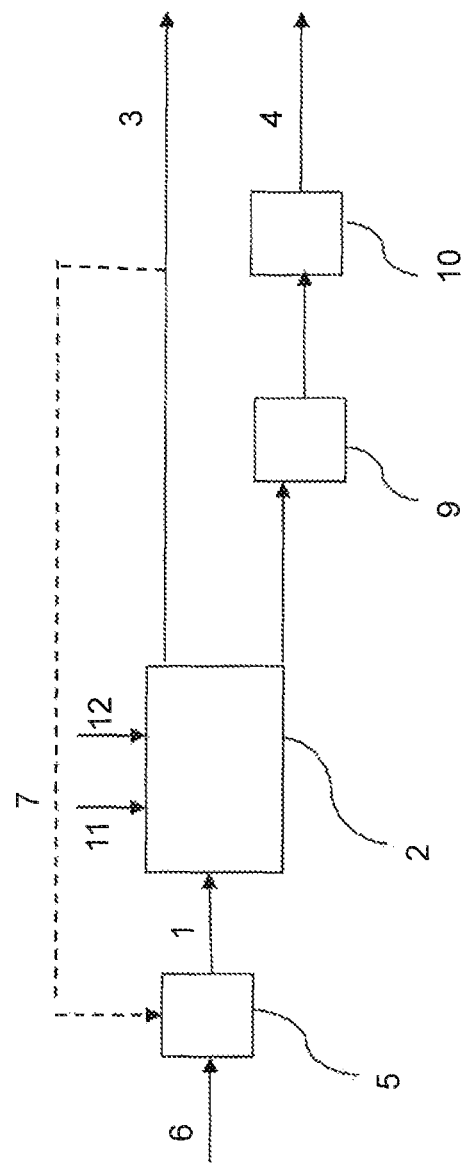
FIG. 3 is a flow chart illustration of a method according to another embodiment of the present invention.

One embodiment of the method of the present invention is shown in FIG. 1. Another embodiment of the method of the present invention is shown in FIG. 2. Another embodiment of the method of the present invention is shown in FIG. 3. Another embodiment of the method of the present invention is shown in FIG. 4.

The apparatus of the present invention comprises at least one separating device for separating the lignin particle fraction (4) and lignocellulose particle fraction (3) from each other in at least one separation step (2,8,9,10), at least one first feeding device for feeding the crude lignin (1) into the separating device, and at least one second feeding device for adding stabilizing chemical (11) and/or hydrophobic chemical (12) into the crude lignin (1), such as into the crude lignin or fraction of the crude lignin, in at least one step.

The invention is based on a solid-solid separation. Further, the invention is based on a combination of chemical and mechanical methods. According to the invention, separation of lignocellulose particles from free lignin particles is important to increase value of lignin composition in various applications. Simultaneously the crude lignin, i.e. lignin composition, is purified. According to the invention, lignocellulose composition can be produced. In the present invention the lignocellulose particles may be circulated back to hydrolysis process.

In this context, starting material (6) means any wood or plant based raw material. The starting material includes lignin, lignocellulose and hemicellulose. In one embodiment, the starting material is selected from the group consisting of wood based raw material, lignin containing biomass such as agricultural residues, bagasse and corn stover, woody perennials, vascular plants and their combinations.

In this context, crude lignin (1) refers any material or composition containing lignin particles, such as free lignin particles. Further, the crude lignin contains also lignocellulose particles. Mainly, the crude lignin comprises cellulose and lignin, but may contain also hemicelluloses. The crude lignin may contain one or more lignin material components. The crude lignin may contain different amounts of lignin particles and lignocellulose particles. Typically, the crude lignin is in the form of suspension which contains water, acid, e.g. formic acid, acetic acid or sulfuric acid, alcohol or other liquid, or in the form cake, lump or the like. In one embodiment, the crude lignin has been diluted with liquid, e.g. with water, and DS is between 1-20%, preferably between 1-10%. Low consistency of suspension aids mechanical separation of free lignin particles and lignocellulose particles. In one embodiment, weight average particle size of the crude lignin is below 1000 µm, preferably below 500 µm.

Preferably, the crude lignin (1) is formed by means of hydrolysis (5). In one embodiment, the hydrolysis is selected from the group consisting of acid hydrolysis, enzymatic hydrolysis, supercritical hydrolysis, subcritical hydrolysis and their combinations. The method of the invention can be used in connection with any hydrolysis process. In one embodiment, the crude lignin is a lignin residue from the hydrolysis or cellulignin.

In one embodiment, the cellulose content, i.e. glucan content, of the crude lignin (1) is 3-70% by weight, preferably 5-60% by weight and more preferable 10-45% by weight, analyzed as glucose. In one embodiment, lignocellulose particles (3) are in the form of fiber sticks in the crude lignin. In one embodiment, weight average particle size of the lignocellulose particle is below 1 mm, in one embodiment below 0.5 mm and in one embodiment below 300 µm.

The stabilizing chemical (11) and/or hydrophobic chemical (12) are added into the crude lignin (1), such as into the crude lignin or fraction of the crude lignin or purified crude lignin, in at least one step. In one embodiment, the stabilizing chemical (11) and/or hydrophobic chemical (12) are added into the crude lignin (1) in one step. In one embodiment, the stabilizing chemical (11) and/or hydrophobic chemical (12) are added into the crude lignin or fraction of the crude lignin or purified crude lignin in more than one step. In one embodiment, the stabilizing chemical (11) and/or hydrophobic chemical (12) are added into the crude lignin or fraction of the crude lignin or purified crude lignin in connection with each separation step. In one embodiment, the stabilizing chemical (11) and/or hydrophobic chemical (12) are added into the crude lignin or fraction of the crude lignin or purified crude lignin in the first separation step and/or in at least one later separation step.

In one embodiment, stabilizing chemical (11) is added into the crude lignin (1), such as into the crude lignin or fraction of the crude lignin or purified crude lignin. In one embodiment, hydrophobic chemical (12) is added into the crude lignin (1), such as into the crude lignin or fraction of the crude lignin or purified crude lignin. In one embodiment, stabilizing chemical (11) and hydrophobic chemical (12) are added into the crude lignin (1), such as into the crude lignin or fraction of the crude lignin or purified crude lignin. In one embodiment, different combinations of stabilizing chemical (11) and hydrophobic chemical (12) may be added in different separation steps. In one embodiment, the stabilizing and hydrophobic chemicals are dosed simultaneously. In one embodiment, the stabilizing and hydrophobic chemicals are dosed sequentially. In one embodiment, the stabilizing and hydrophobic chemicals are added into the crude lignin and the crude lignin is mixed, preferably by high-shear mixing. The chemicals can be added into slurry of low or high dry solids content. The high-shear mixing is beneficial to facilitate adsorption of chemicals, especially hydrophobic chemical, on surfaces. The stabilizing chemical predominantly adsorbs on lignocellulose particles, while the hydrophobic chemical predominantly adsorbs on free lignin particles.

In one embodiment, the stabilizing chemical (11) is polysaccharide as such or modified polysaccharide. In this context, the stabilizing chemical is typically hydrophilic chemical. In one embodiment, the stabilizing chemical is selected from the group consisting of carboxymethyl cellulose (CMC), polyanionic cellulose (PAC), other cellulose derivatives, e.g. ethylhydroxyethyl cellulose and methyl cellulose, native guar gum, modified guar gum, native starch, modified starch, pectin, glycogen, callose, chrysolaminarin, native hemicellulose, modified hemicellulose, xylan, mannan, galactomannan, galactoglucomannan (GGM), arabinoxylan, glucuronoxylan and xyloglucan, fucoidan, dextran, alginate, other polysaccharide and their combinations. Said stabilizing chemical may be in native form or in modified form. In one embodiment, the stabilizing chemical is carboxymethyl cellulose (CMC). Preferably, function of the stabilizing chemical is to keep suspended lignocellulose particles stable through chemical interaction. Therefore, treated lignocellulose particles remain in suspension while free lignin particles are separated from suspension.

In one embodiment, the hydrophobic chemical (12) is selected from the group consisting of fuel oil, bio fuel oil, diesel oil, biodiesel oil, naphta, bionaphta, kerosene, biokerosene, other middle distillate fraction, gasoline, biogasoline, naphthalene, bionaphthalene, mineral spirit, other hydrocarbon solvent and their combinations. In one embodiment, the hydrophobic chemical is oil based chemical or bio-oil based chemical. In one embodiment, the hydrophobic chemical is selected from the group consisting of diesel oil, biodiesel oil, fuel oil, bio fuel oil, kerosene, biokerosene, other middle distillate fraction, and their combinations. Preferably, function of the hydrophobic chemical is to cause aggregation of lignin particles together with stabilizing chemical. Increase in particle size of the lignin will help separation by mechanical means. It will also increase hydrophobicity of the lignin particles thus facilitating dewatering. Need for the hydrophobic chemical is determined by surface properties of free lignin particles, which are largely dependent on physico-chemical conditions in previous process stages. The hydrophobic chemical has non-polar nature.

In one embodiment, pH is adjusted in the crude lignin before the separating. In one embodiment, pH is adjusted to value between 5-7.

In one embodiment, the separation of the lignocellulose particle fraction and lignin particle fraction is carried out in pH range between 1-10, preferably between 5-9. Often near neutral pH, such as pH between 5-9, stabilizes the lignocellulose particles thus facilitating separation. On the other hand, acidic conditions destabilize the lignin particles improving separation at low pH values.

The separation can be carried out in wide temperature range, e.g. temperatures between 0-100° C. Higher temperature usually aids the separation due to lower viscosity. Generally near natural process temperature is utilized to avoid heating or cooling.

In one embodiment, the lignin particle fraction (4) and lignocellulose particle fraction (3) are separated from each other by means of a separation method selected from the group consisting of centrifugal forces, sedimentation, elutriation, aggregation, flotation, flocculation, screening and their combinations. In one embodiment, the separating is made by means of centrifugal forces. In one embodiment, the separating is made by means of sedimentation. In one embodiment, the separating is made by means of elutriation. In one embodiment, the separating is made by means of agglomeration. In one embodiment, the separating is made by means of flocculation. In one embodiment, the separating is made by means of flotation. In one embodiment, the separating is made by means of screening. In a preferred embodiment, the lignin particle fraction (4) and lignocellulose particle fraction (3) are separated from each other so that the lignocellulose particle fraction (3) is separated from the crude lignin (1) and remaining crude lignin is the lignin particle fraction (4), i.e. the purified crude lignin.

In one embodiment, the apparatus comprises at least two separating device for separating the lignin particle fraction (4) and lignocellulose particle fraction (3) and/or purifying the lignin particle fraction (4) and/or purifying lignocellulose particle fraction (3). In one embodiment, the separating device is based on centrifugal forces, sedimentation, elutriation, aggregation, flotation, flocculation, screening or their combinations. The separating device may be reactor, vessel, tank, bowl, cyclone, column, cell, basin, thickener or the like.

In one embodiment, the lignin particle fraction (4) and lignocellulose particle fraction (3) are separated in one separation step (2,8,9,10). In one embodiment, the lignin particle fraction (4) and lignocellulose particle fraction (3) are separated in more than one separation step (2,8,9,10).

In one embodiment, the lignin particle fraction (4) and lignocellulose particle fraction (3) are separated from each other in the first separation step (2). In one embodiment, the first separation step is an initial separation, such as rougher separation step. The first separation step for separating the lignocellulose particle fraction and lignin particle fraction is made by means of centrifugal forces, e.g. by basket centrifuge or decanter centrifuge such as solid bowl centrifuge, or flotation, e.g. by froth flotation or column flotation. In flotation, stabilized lignocellulose particles remain in suspension while free lignin particles are raised by air bubbles to surface and then either scraped or collected as overflow.

In one embodiment, the lignocellulose particle fraction (3) is separated from the lignin particle fraction (4) as a clarifying fraction, e.g. as an overflow of the thickener, in the separation step (2, 8,9,10).

The lignocellulose particle fraction (3) may contain also other components or agents than lignocellulose particles. In one embodiment, the lignocellulose particle fraction (3) is treated, preferably after the first separation step (2), by purifying in at least one separation step (8) which may be selected from the separation methods described above. In one embodiment, the lignocellulose particle fraction (3) is treated, preferably purified, in at least one scavenger separation step. In one embodiment, the lignocellulose particle fraction (3) is treated in two scavenger separation steps. If needed, these purifying steps can be incorporated to recover remaining lignin particles from lignocellulose particle fraction.

In one embodiment, the lignocellulose particle fraction (3) is in the form of suspension. This suspension contains liquid, such as water. In one embodiment, the lignocellulose particle fraction is thickened. If needed, the lignocellulose particle fraction can be thickened by dosing cationic flocculant, e.g. cationic polyacrylamide, followed by centrifuge, thickener or cyclone. Utilization in other applications generally involves further dewatering, e.g. by filter or screw press, followed by drying.

In one embodiment, the lignocellulose particle fraction (3) is dewatered, e.g. by a screw press. In one embodiment, the lignocellulose particle fraction (3) is ground.

In one embodiment, the lignocellulose particle fraction (3) is circulated (7) back to manufacturing process of the crude lignin, e.g. to hydrolysis process (5). Alternatively, the lignocellulose particle fraction (3) is circulated to a separate hydrolysis process. Liquid in the lignocellulose particle fraction replaces partly or totally fresh water needed in dilution of biomass particles prior to hydrolysis. In one embodiment, the apparatus comprises a circulations means for circulating (7) the lignocellulose particle fraction (3) back to manufacturing process of the crude lignin.

In one embodiment, the lignin particle fraction (4) is sediment, sludge, residuum or deposit of the separation step. In one embodiment, the lignin particle fraction (4) is removed as an underflow of separating device, e.g. thickener, in the separation step (2,8,9,10).

The lignin particle fraction (4) may contain also other components or agents than lignin particles. In one embodiment, the lignin particle fraction (4) is treated, preferably after the first separation step (2), by purifying in at least one separation step (9,10) which may be selected from the separation methods described above. In one embodiment, the lignin particle fraction (4) is treated, preferably purified, in at least one cleaning separation step. In one embodiment, the lignin particle fraction (4) is treated in two cleaning separation steps. In one embodiment, the lignin particle fraction is treated in the cleaning separation step by means of centrifugal cleaning e.g. by hydrocyclone, sedimentation, e.g. by thickener, elutriation, aggregation, flotation, flocculation and/or screening. In one embodiment, the lignin particle fraction is removed from the cleaning separation step as an underflow or as a sediment, sludge, residuum or deposit.

In one embodiment, the lignin particle fraction (4) is washed. The purified lignin can be easily neutralized in washing stage without negatively affecting dewatering performance.

One benefit of this kind of separation process is that it tolerates presence of soluble oligomeric sugars in the lignin residue. Typically, if the lignin residue is not carefully washed there are oligomeric sugars present, which make filtration extremely complicated due to clogging tendency. In the present invention, the filtration is only performed for the final lignin particle fraction, which is washed and, therefore, contains no oligomeric sugars. Oligomeric sugars may be carried over with the lignocellulose particle fraction back to hydrolysis process. This procedure enables savings in dewatering and washing of the lignin residue, and also leads to higher sugar concentration in the hydrolysate. If there is a process without washing the lignin residue, then present invention demonstrates improved sugar yield.

In one embodiment, the lignin particle fraction (4) is filtrated, e.g. by a pressure filter. In one embodiment, the lignin particle fraction (4) is dewatered. In one embodiment, the lignin particle fraction (4) is treated by grinding.

In one embodiment, the apparatus comprises at least one dewatering device for dewatering the lignin particle fraction (4) or the lignocellulose particle fraction (3).

Improvement in dewatering of the lignin is important for the present invention. Removal of the lignocellulose particles clearly improves dewatering of the lignin. This means that less energy is needed in drying, and often investment in dryer can be neglected totally, if the purified lignin is burnt or used in applications not requiring low moisture content. Size of free lignin particles after hydrolysis is generally big, e.g. d50 over 10 μm, as compared to precipitated lignin particle meaning higher filtration rate and dry solids content of filter cake.

The process of the present invention minimizes waste water and often totally closed loop can be achieved. Clean water is added only in a final stage of the lignin purification. With suitable consistency of the lignocellulose particle fraction incoming and outgoing flows are in balance without additional flow to waste water treatment plant. The lignin is not dissolved in any stage preventing formation of low molecular weight phenolic compounds, which would otherwise complicates circulation or disposal of filtrates and overflows.

According to present invention a lignin particle composition can be formed. The lignin particle composition includes lignin particle fraction of the crude lignin in which the crude lignin has been formed from starting material and the crude lignin comprises lignocellulose particles and lignin particles, and the lignin particle fraction has been formed from the crude lignin by adding stabilizing chemical and/or hydrophobic chemical into the crude lignin, and by separating the lignocellulose particle fraction from the lignin particle fraction in at least one separation step. The lignin particle composition may be used as component in manufacturing a final product selected from the group consisting of activated carbon, carbon fiber, lignin composite, binder material, resins, phenolic component and/or dispersion agent. In one embodiment, the lignin particle composition is used as an adsorbent for oil or heavy metals. In one embodiment, the lignin particle composition is used as combustible matter in energy production.

According to present invention a lignocellulose particle composition can be formed. The lignocellulose particle composition includes lignocellulose particle fraction of the crude lignin in which the crude lignin has been formed from starting material and the crude lignin comprises lignocellulose particles and lignin particles, and the lignocellulose particle fraction has been formed from the crude lignin by adding stabilizing chemical and/or hydrophobic chemical into the crude lignin, and by separating the lignocellulose particle fraction from the lignin particle fraction in at least one separation step. The lignocellulose particle composition may be used as component in manufacturing a product selected from the group consisting of composites, wood composites, wood-plastic composites comprising composites formed from plastic, synthetic polymers, biopolymers, rubber or their combinations together with wood, resins, preferably as filler in resins, wood based materials, wood based fillers, construction materials, building boards, glue boards and/or other wood based boards, such as a particle board, an oriented strand board, a chip board, an intrallam, a gluelam, a hardboard, a waferboard, a fiber board or a plywood. In one embodiment, the lignocellulose particle composition is used as combustible matter in energy production.

The method according to the present invention provides the lignin particle composition and the lignocellulose particle composition with good quality. When improving the purify and increasing dry solids content of the lignin and lignocellulose compositions so then it may be provided better properties of the final product. Thanks to the invention, preferably improved filterability is achieved. Further, by means of the invention dewatering can be improved. Preferably, treating costs of the lignin can be decreased. Further, thanks to the invention heat value of the lignin and lignocellulose compositions can be increased so that the heat value without drying may even at least be duplicated.

The present invention provides an industrially applicable, simple and affordable way of making the purified lignin based composition and lignocellulose composition from the starting material. The method according to the present invention is easy and simple to realize as a production process. The method according to the present invention is suitable for use in the manufacture of the different lignin and lignocellulose based products and final products from different starting materials. In one embodiment, the crude lignin is purified from the lignocellulose particles. Further, the lignin and lignocellulose compositions can be used as sources of energy.

EXAMPLES

The invention is described in more detail by the following examples with reference to accompanying drawings.

Example 1

In this example a lignocellulose particle fraction (3) and lignin particle fraction (4) are separated according to a process of FIG. 1.

The crude lignin (1) is formed from starting material (6) comprises lignocellulose particles and lignin particles by means of hydrolysis (5). The crude lignin (1) is fed into the separation step (2) wherein stabilizing chemical (11) and/or hydrophobic chemical (12) are fed into the crude lignin (1). The lignocellulose particle fraction (3) is separated from the crude lignin so that remaining crude lignin is the lignin particle fraction (4), i.e. the purified crude lignin. Alternatively, the lignocellulose particle fraction (3) may be circulated back to the manufacture of the crude lignin.

Example 2

In this example a lignocellulose particle fraction (3) and lignin particle fraction (4) are separated according to a process of FIG. 2.

The crude lignin (1) is formed from starting material (6) comprises lignocellulose particles and lignin particles by means of hydrolysis (5). The crude lignin (1) is fed into the first separation step (2) wherein stabilizing chemical (11) and/or hydrophobic chemical (12) are fed into the crude lignin (1). The lignocellulose particle fraction (3) is separated from the crude lignin, and the separated lignocellulose particle fraction (3) is purified in the additional separation step (8). Stabilizing chemical (11) and/or hydrophobic chemical (12) may be added in the additional separation step (8). The remaining crude lignin residuum is purified in the additional separation step (9) in order to form the lignin particle fraction (4), i.e. the purified crude lignin. Stabilizing chemical (11) and/or hydrophobic chemical (12) may be added in the additional separation step (9). In an alternative embodiment, the stabilizing chemical (11) and/or hydrophobic chemical (12) are added only into the fraction of the crude lignin, such as the lignocellulose particle fraction and/or remaining crude lignin residuum, in the additional separation step (8) and/or additional separation step (9) after the first separation step (2).

Alternatively, the lignocellulose particle fraction (3) may be circulated back to the manufacture of the crude lignin.

Example 3

In this example a lignocellulose particle fraction (3) and lignin particle fraction (4) are separated according to a process of FIG. 3.

The crude lignin (1) is formed from starting material (6) comprises lignocellulose particles and lignin particles by means of hydrolysis (5). The crude lignin (1) is fed into the first separation step (2) wherein stabilizing chemical (11) and/or hydrophobic chemical (12) are fed into the crude lignin (1). The lignocellulose particle fraction (3) is separated from the crude lignin. The remaining crude lignin residuum is purified in the second (9) and third (10) separation steps in order to form the lignin particle fraction (4), i.e. the purified crude lignin. Stabilizing chemical (11) and/or hydrophobic chemical (12) may be added in the second (9) and/or third (10) separation steps. Alternatively, the lignocellulose particle fraction (3) may be circulated back to the manufacture of the crude lignin.

Example 4

In this example, lignin (4) was purified and lignocellulose (3) was separated from the crude lignin (1) according to FIG. 4.

The crude lignin (1) analyzed to contain 63.3% acid-insoluble lignin, 3.4% acid-soluble lignin, 35.8% glucose and 36.3% total carbohydrates was re-slurried with water (14). Slurry was diluted (13) to 4% dry solids content and pH was 3.7. Carboxymethyl cellulose (CMC) (11) was added 3.5 kg/t ds and kerosene (12) was added simultaneously 4.5 kg/t ds followed by high-shear mixing for 3 min. Rougher purification was performed using Alfa Laval LAPX 404 separator (basket centrifuge) by feed rate of 15 l/min at 50° C. temperature in the first separation step (2). After rougher stage sediment contained 88.2% acid-insoluble lignin, 2.6% acid-soluble lignin and 8.3% glucose. Lighter solid phase, i.e. lignocellulose fraction (3), contained only 25.1% acid-insoluble lignin and 2.0% acid-soluble lignin referring to efficient solid-solid separation. Great majority of lignin present in lighter solid phase is bound into lignocellulose particles.

The collected pre-cleaned lignin (15) was further cleaned in two stages (9,10) utilizing sedimentation. Slurry was diluted to 5% dry solids content with clean water (18). CMC (11) was added 1.0 kg/t ds and kerosene (12) was added simultaneously 1.4 kg/t ds followed by high-shear mixing for 3 min. 800 ml of slurry was sedimented for 10 min at 40° C. temperature. Surprisingly, black lignin particles rapidly settled, while brown lignocellulose particles remained in suspension. Overflow (16) was decanted away and black high-consistency (ds 50%) underflow (17) was further cleaned in the third stage (10) in similar manner than in the second stage (9) except that CMC (11) was now dosed 0.5 kg/t ds and kerosene (12) was dosed 0.7 kg/t ds. Surprisingly, it was observed that the separation of the lignin particles and lignocellulose particles can be made successfully though there is only small difference in density and size of said particles.

After purification lignin product (4) containing 94.3% acid-insoluble lignin, 3.2% acid-soluble lignin and 2.7% glucose was recovered.

Example 5

In this example, lignin (4) was purified and lignocellulose (3) was separated from the crude lignin (1) according to a process of FIG. 4.

The crude lignin (1) contained 97% particles smaller than 100 μm as measured by screening. Median particle size was 20 μm measured by Coulter LS laser diffraction analyzer.

The crude lignin (1) analyzed to contain 68.0% acid-insoluble lignin, 1.9% acid-soluble lignin, 31.3% glucose and 31.8% total carbohydrates was re-slurried with water (14). Slurry was diluted (13) to 3.5% dry solids content and pH was adjusted to 6.5 with NaOH. Carboxymethyl cellulose (CMC) (11) was added 4.5 kg/t ds followed by high-shear mixing for 3 min. Rougher purification was performed using Alfa Laval LAPX 404 separator (basket centrifuge) by feed rate of 15 l/min at 52° C. temperature in the first separation step (2). After rougher stage sediment contained 85.1% acid-insoluble lignin, 1.8% acid-soluble lignin and 12.7% glucose.

The collected pre-cleaned lignin (15) was further cleaned in two stages (9,10) utilizing sedimentation. Slurry was diluted to 5% dry solids content with clean water (18). CMC (11) was added 1.0 kg/t ds followed by high-shear mixing for 3 min. 800 ml of slurry was sedimented for 10 min at 50° C. temperature. Black lignin particles rapidly settled, while brown lignocellulose particles remained in suspension. Overflow (16) was decanted away and black high-consistency underflow (17) was further cleaned in the third stage (10) in similar manner than in the second stage (9) except that CMC (11) was now dosed 0.5 kg/t ds.

After purification lignin product (4) containing 89.7% acid-insoluble lignin, 1.4% acid-soluble lignin and 6.1% glucose was recovered. In the cleaning stages recovery of underflow solids was 50% of total solids.

As reference, test was repeated for crude lignin (1) without addition of CMC (11) and without pH adjustment. After rougher stage (2) sediment contained 82.0% acid-insoluble lignin, 1.8% acid-soluble lignin and 17.8% glucose. During cleaning stages (9, 10) no aggregation or fast settling of free lignin particles was noticed. Additionally, lignocellulose particles started to destabilize, i.e. to settle. Similar mass of wet underflow was collected as in test applying CMC. After purification lignin product (4) containing 85.6% acid-insoluble lignin, 1.6% acid-soluble lignin and 10.7% glucose was recovered. In the cleaning stages recovery of underflow solids was only 8% of total solids.

The results show that applying CMC as stabilizing agent clearly improves selectivity of mechanical solid-solid separation as compared to situation without any chemicals.

Example 6

In this example, the purified lignin product (4) formed according to Example 3 was filtrated.

The purified crude lignin slurry (4) at pH 7.0 was filtrated using horizontal 0.1 m² plate pressure filter. As reference crude lignin without purification was also filtrated. The crude lignin in 40% dry solids content was re-slurried with clean water to 14.4% ds before filtration, pH of filtrated slurry was 3.4. In both cases compression stage was ended when filtrate flow lowered to 15 ml/kg ds cake/min. Filtration temperature was 60-70° C. Results are shown in Table 1.

TABLE 1

| Sample | Dry solids content of filter cake (%) | Filtration rate (kg ds/m²/h) |
|---|---|---|
| Crude lignin | 48.4 | 1.3 |
| Purified lignin | 81.3 | 564 |
| Purified lignin | 83.2 | 455 |

Filtration rate was calculated based on combination of feed, compression and air blow (30 s) stages. Technical time was not taken into account. Huge difference in filtration rates between the purified and crude lignins is mostly caused by variation in compression time. For the purified lignin 2-3 min at 15 bar was enough, whereas 150 min at 15 bar was needed for the crude lignin. Also amount of lignin filtrated per cycle is significantly higher for the purified lignin. Exceptionally high dry solids content for the purified lignin cake was demonstrated together with high filtration rate in neutral conditions.

The method according to the present invention is suitable in different embodiments to be used for separating the most different kinds of lignocellulose particles from lignin particles.

The invention is not limited merely to the example referred to above; instead many variations are possible within the scope of the inventive idea defined by the claims.

The invention claimed is:

1. A method for separating a lignocellulose particle fraction and a free lignin particle fraction from crude lignin, the method comprising:
    adding a stabilizing chemical and, optionally, a hydro-phobic chemical into the crude lignin in at least one step, such that the lignocellulose particle fraction remains suspended through chemical interaction and the free lignin particle fraction is separated from suspension, wherein the crude lignin is formed from a wood or plant-based raw material using hydrolysis, wherein the stabilizing chemical is selected from the group consisting of carboxymethyl cellulose (CMC), polyanionic cellulose (PAC), ethylhydroxyethyl cellulose, methyl cellulose, native guar gum, modified guar gum, native starch, modified starch, pectin, glycogen, callose, chrysolaminarin, native hemicellulose, modified hemicellulose, xylan, mannan, galactomannan, galactoglucomannan (GGM), arabinoxylan, glucuronoxylan, xyloglucan, fucoidan, dextran, alginate, and any combination thereof; and
    separating the free lignin particle fraction and the lignocellulose particle fraction from the crude lignin in at least one solid-solid separation step, wherein the crude lignin has not been dissolved or digested in a solvent prior to the solid-solid separation, and wherein the free lignin particle fraction is removed as an underflow in the solid-solid separation step.

2. The method according to claim 1, wherein the at least one solid-solid separation step is more than one solid-solid separation step.

3. The method according to claim 1, wherein the at least one solid-solid separation step includes application of centrifugal forces, sedimentation, elutriation, aggregation, flocculation, screening, or any combination thereof.

4. The method according to claim 1, wherein the crude lignin is formed by hydrolysis.

5. The method according to claim 1, wherein the stabilizing chemical is polysaccharide.

6. The method according to claim 1, wherein the hydrophobic chemical includes diesel oil, biodiesel oil, fuel oil, bio fuel oil, kerosene, biokerosene, other middle distillate fraction, or any combination thereof.

7. The method according to claim 2, wherein the free lignin particle fraction and lignocellulose particle fraction are separated from each other in the first separation step.

8. The method according to claim 1 further comprising purifying the lignocellulose particle fraction in at least one purification step.

9. The method according to claim 1 further comprising purifying the free lignin particle fraction in at least one purification step.

10. The method according to claim 1, further comprising:
    forming the crude lignin from a starting material; and
    circulating the lignocellulose particle fraction such that the lignocellulose particle fraction is combined with the starting material to form additional crude lignin.

11. The method of claim 1, wherein the adding of the stabilizing chemical and, optionally, the hydro-phobic chemical does not dissolve the crude lignin.

12. The method of claim 1, wherein, during the separating of the free lignin particle fraction and the lignocellulose particle fraction from the crude lignin, the free lignin particle fraction and the lignocellulose particle fraction are solids.

13. The method of claim 1, wherein the separating of the free lignin particle fraction from the lignocellulose particle fraction is subsequent to the addition of the stabilizing chemical and/or the hydro-phobic chemical.

* * * * *